July 19, 1938.   C. G. OLSON   2,124,119
GEAR TESTING MACHINE
Filed Feb. 8, 1937   3 Sheets-Sheet 1
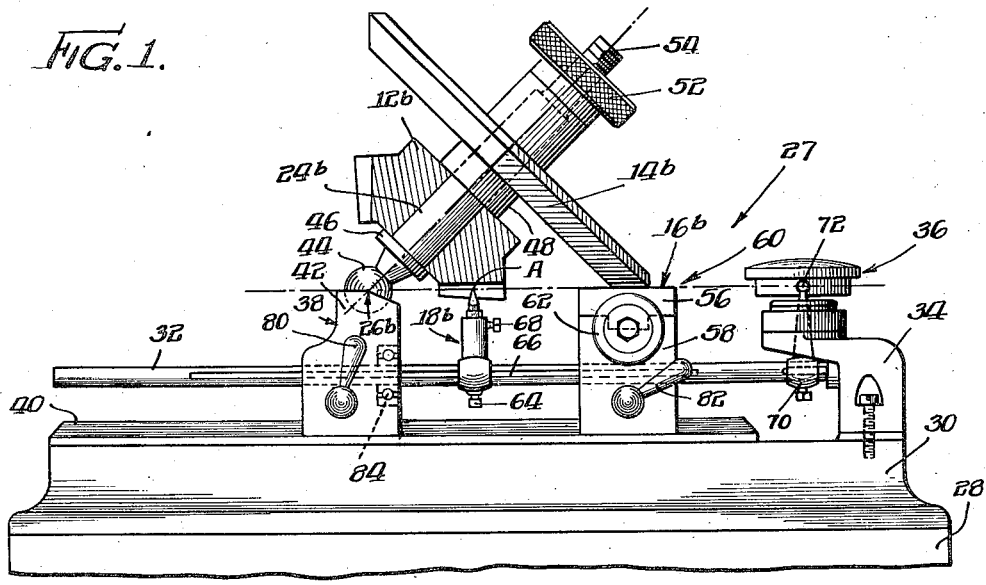
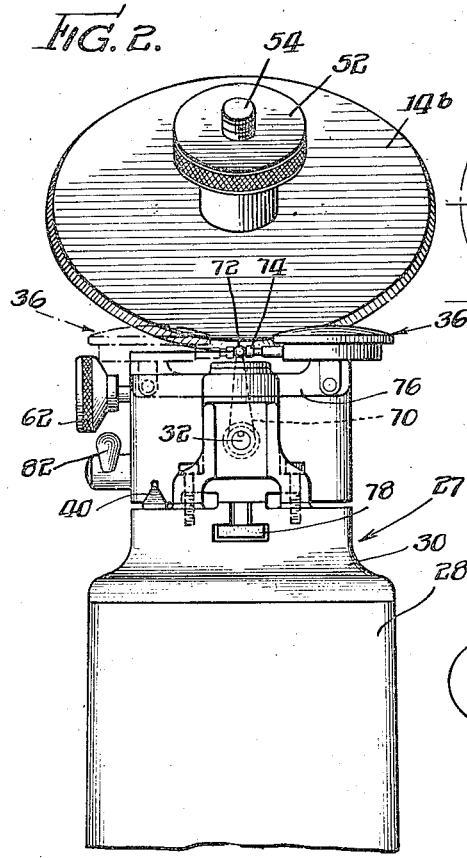
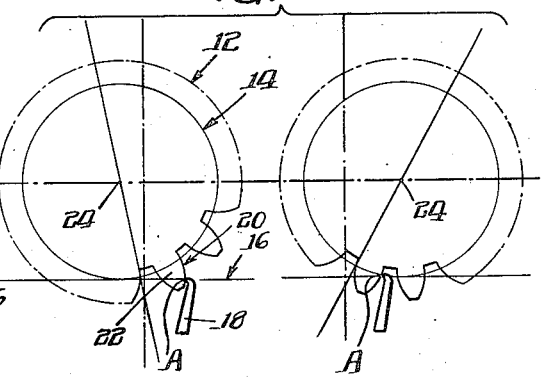
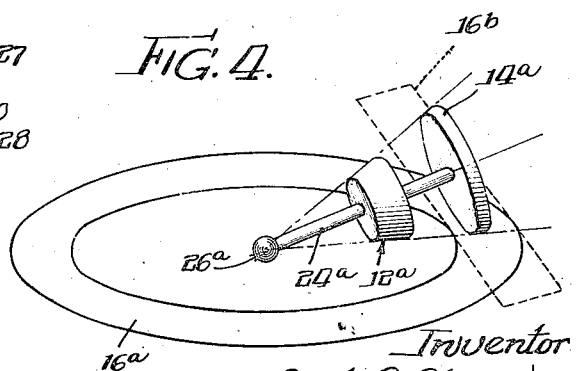
Inventor
Carl G. Olson
By:- Cox & Moore attys July 19, 1938.  C. G. OLSON  2,124,119
GEAR TESTING MACHINE
Filed Feb. 8, 1937    3 Sheets-Sheet 2
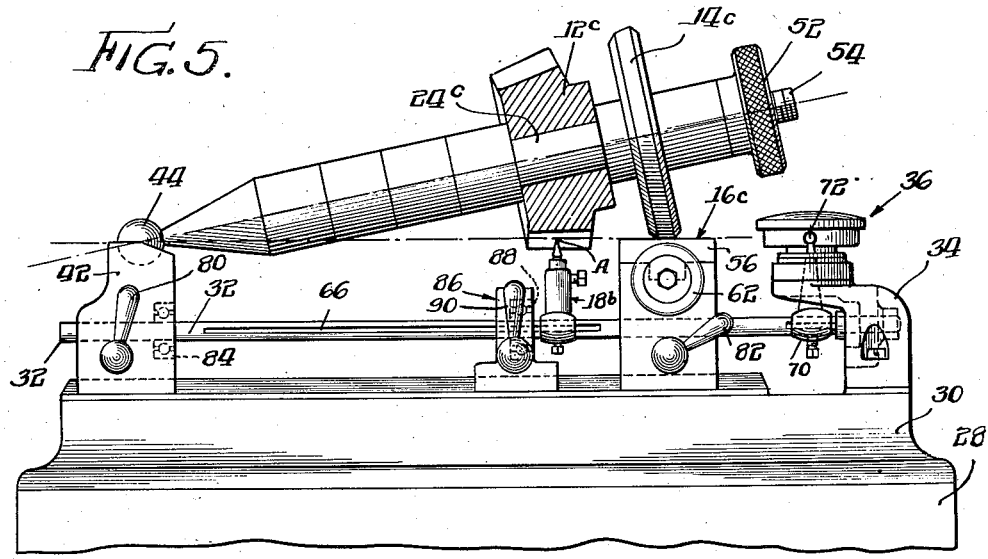
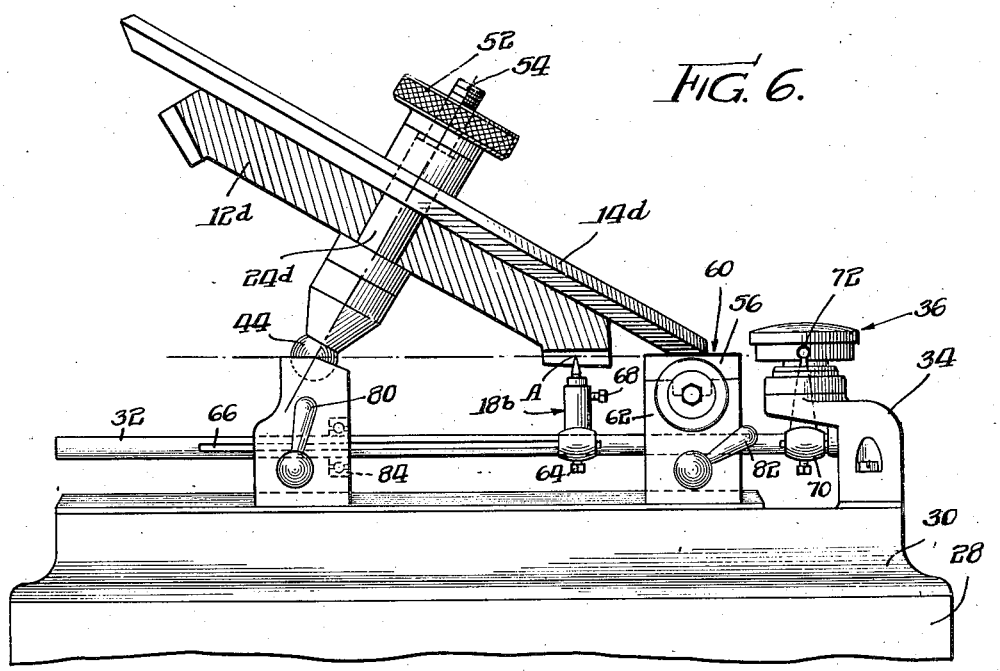
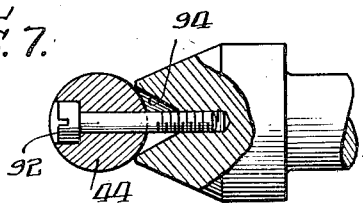
Inventor:-
Carl G. Olson
By:- Cox & Moore attys.

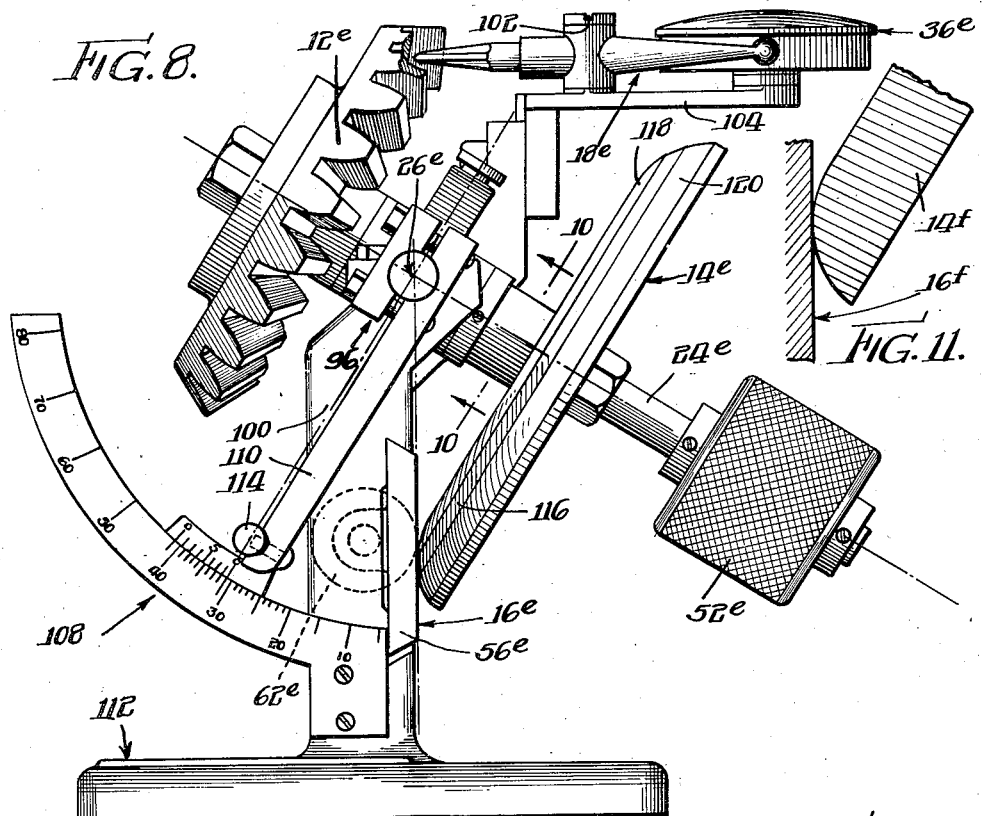

Patented July 19, 1938

2,124,119

UNITED STATES PATENT OFFICE 2,124,119

GEAR TESTING MACHINE

Carl G. Olson, Chicago, Ill., assignor to Illinois Tool Works, Chicago, Ill., a corporation of Illinois Application February 8, 1937, Serial No. 124,592

9 Claims. (Cl. 33—174)

This invention relates generally to gear testing machines, and more particularly to machines for testing the involute surfaces of beveled gears.

It is an important object of the present invention to provide a machine of simple and durable construction whereby the involute curve of a beveled gear may be very accurately tested.

More specifically, my invention contemplates a testing machine, as set forth above, wherein a beveled gear to be tested may in effect be rolled upon the base cone from which the involute curves of the teeth are generated.

It is an object of the invention to provide a machine, as set forth above, whereby beveled gears of various sizes may be tested with a minimum degree of effort and skill on the part of the user.

Still more specifically, this invention contemplates a testing machine, as set forth above, wherein a cone base member conforming with the base cone of the gear to be tested may be rolled along a plane surface to enable a contactor positioned in the vicinity of the involute surface of the gear to accurately detect any variation in said surface from the true involute.

The foregoing and numerous other objects and advantages will be more apparent from the following detailed description when considered in connection with the accompanying drawings, wherein:

Figure 1 is a front elevational view of a machine constructed in accordance with the teachings of the present invention with a bevel gear in section shown in operative association with the contactor;

Figure 2 is a view of the machine shown in Figure 1 as viewed from the right thereof;

Figure 3 diagrammatically illustrates the manner in which the involute surface of the gear may be tested by rolling the gear along its base or generating circle, two positions of the gear being shown, one at the left and the one at the right;

Figure 4 is a diagrammatic representation of the principle upon which the machine of Figures 1 and 2 operates;

Figure 5 is a front elevational view disclosing the manner in which the machine of Figure 1 may be adjusted to accommodate a bevel gear differing in angularity with respect to the gear shown in Figure 1;

Figure 6 discloses the machine of Figure 1 accommodating a bevel gear considerably larger than the bevel gears shown in Figures 1 and 5;

Figure 7 is an enlarged fragmentary detail view of the lower or bearing extremity of the gear and roller supporting spindle, a portion thereof being broken away to more clearly illustrate the manner in which the ball is secured and centered within said spindle;

Figure 8 discloses a modified bevel gear testing machine wherein the gear to be tested and the base cone member are positioned on opposite sides of the pivotal point;

Figure 9 is a fragmentary view of the machine shown in Figure 8, said view being taken from the right of Figure 8, the base cone member being indicated by dot-and-dash lines whereby to render visible parts otherwise hidden;

Figure 10 is a detailed fragmentary view of the universal mounting structure, said view being taken along the line 10—10 of Figure 8; and Figure 11 illustrates in cross section a fragmentary portion of a base cone member of modified form in operative association with a plane surface.

Before discussing the structural details of the machine illustrated in the drawings representing embodiments of the invention, it should be borne in mind that the involute surface of a gear tooth is generated from a base or generating circle. This is best illustrated in Figure 3 wherein a gear blank, indicated generally by the numeral 12, has its generating circle indicated by the numeral 14. Thus, when the gear 12 is rolled along a plane surface 16 as, for example, from the left in Figure 3 to the position shown at the right in Figure 3, the contactor 18 touching the involute surface 20 of a gear tooth 22, will experience no lateral displacement if the surface 20 conforms in curvature with the true involute. However, any slight variation from the true involute will cause the contactor 18 to experience slight lateral displacement and such displacement may be magnified for observation on a suitable indicator later to be described.

From the foregoing explanation it will be apparent that the base circle or member 14 of a conventional spur gear comprises a cylinder, and hence may correctly be referred to as a base cylinder, having its axis indicated by the numeral 24 (Figure 3). Referring now to Figure 4, it will be seen that I have disclosed a cone gear blank 12a and a cone base member 14a, which correspond, respectively with the elements 12 and 14 of Figure 3. In practice the gear member 12a obviously is provided with the usual bevel gear teeth, but, for the purpose of illustration, the teeth have been omitted, leaving only that portion of the gear which is encircled by the imaginary base or generating cone of the gear. The gear 12a cannot actually be rolled along its base or generating cone because of the presence of the gear teeth, and hence the base cone member 14a is employed which is coaxial with the member 12a and, in fact, mounted upon the same spindle 24a. Assume that the apex 26a of the cone indicated by the dot-and-dash lines coincident with the conical surfaces of the members 12a and 14a lies in the same plane as the circular surface 16a, and that the conical surface of the base member 14a rolls along said surface 16a. This causes the gear member or blank 12a to roll along its generating conical surface in the same sense as the generating circle 14 of the gear 12 rolls along the surface 16. In view of the fact that it is only necessary to impart a slight degree of rotation to the gear blank 12a for the purpose of testing same with a contactor, such as the contactor 18 in Figure 3, the surface 16a may be a surface as indicated by the dotted lines 16b in Figure 4.

With the foregoing statement of the theory of operation of the conical base cone 14a with respect to the gear 12a in mind, reference is now made to the testing machine of Figures 1 and 2 designated generally by the numeral 27. This machine incorporates a suitable bed 28 which supports a machine base 30. A horizontally disposed bar or rod 32 is supported at one end above the base 30 in a bracket or support 34, which will hereinafter be referred to as the indicator support because this support carries a dial type indicator mechanism designated generally by the numeral 36. A second support 38 for the bar 32, which supoprt will hereinafter be referred to as the spindle support, is adapted to be horizontally adjusted along a V-guide 40. The upper portion of the spindle support 38 provides a bearing or socket 42.

The socket 42 is designed to receive an apex ball member 44 secured to the lower end of a spindle 24b, the center 26b of the ball 44 being coincident with the axis of said spindle. This spindle 24b serves as a support or carrier for a bevel gear to be tested—for example, the bevel gear 12b in Figure 1. A shoulder 46 on the spindle 24b prevents downward displacement of the gear 12b, the upper portion of the gear being engaged by a suitable spacing collar 48. Engaging the opposite side of the collar 48 is a roller 14b, which may be referred to hereinafter as a base cone member. The base cone member 14b and gear 12b are clamped together by means of a suitable knurled head 52, which is screwed upon the reduced outer threaded extremity 54 of the spindle 24b. This head 52 in addition to serving as a clamping element, provides a gripping surface adapted to be engaged when rotary movement is to be imparted to the base cone member 14b, as will hereinafter more clearly appear.

The peripheral conical or frusto-conical surface of the base member 14b rests upon a horizontal plane surface or track 16b, said surface corresponding with the surface 16b diagrammatcially illustrated by the dotted lines in Figure 4. This plane surface 16b is provided along the upper surface of a block or plate 56, which in turn is horizontally slidable upon the upper portion of a support or block 58. The elements 16b, 56, and 58 comprise a roller supporting means designated generally by the numeral 60. Adjustment of the plate 56 along the upper surface of the block 58 transversely of the base 30 is accomplished by manual manipulation of a wheel 62 secured to the outer end of a conventional screw (not shown).

A contactor designated generally by the numeral 18b is supported by the rod or bar 32 and may be adjustably positioned along said rod. A suitable set screw 64 serves to secure the contactor in the desired position, and a keyway 66 cooperates with a complementary section on the contactor to maintain the contactor in its normal upright position. A suitable set screw 68 serves to secure the work engaging portion or point of the contactor in its proper vertical position. The point at which the contactor 18b actually engages the involute surface of the tooth of the bevel gear 12b is indicated by the letter A. It will be noted that the center or apex 26b, the point A, and the plane surface or track 16b all lie in the same horizontal plane, and this plane is tangent to the imaginary base cone of the bevel gear 12b, the roller or base cone member 14b cooperating with the plane surface 16b and the apex 26b in causing the gear 12b in effect to roll along the imaginary peripheral surface of the base cone thereof when rotation is manually imparted to the knurled head 52.

The contactor 18b is operatively connected with the dial indicator mechanism 36 through the rod or bar 32 and an actuating arm 70 secured to and extending upwardly from the rod 32 in the vicinity of the indicator supporting bracket 34. The upper or free extremity of the arm 70 has a contactor ball 72, which engages the shiftable element 74 of the dial indicator mechanism 36, as clearly indicated in Figure 2. The tendency for the member 74 to shift to the left (Figure 2) under the influence of the spring mechanism within the indicator means 36 insures continuous engagement of the contactor 18b with the complementary tooth of the supported gear.

From the foregoing description it will be apparent that when the bevel gear 12b and the base cone member 14b are mounted in the position previously explained, namely, with the apex 26b, the plane surface 16b, and the contactor point A positioned in the same plane, the testing of the gear 12b may be started. To insure engagement of the contactor point A with the involute surface of the gear tooth, the wheel 62 may be rotated slightly so as to bring the involute surface of the gear into engagement with the contactor point A. This will cause movement of the indicator needle (not shown) of the indicator mechanism 36 and said mechanism may be set at a zero point from which point variations in surface contour of the gear tooth may be observed. After the indicator has been so set, rotation may be imparted to the knurled head 52, thereby causing the base cone member 14b to roll along the plane surface 16b. This causes the imaginary base cone of the bevel gear 12b to roll along a plane coincident with the plane surface 16b. If the surface of the gear tooth conforms with the true involute curve, no movement will be experienced by the indicator 12b. However, all variations from the true involute will be visually apparent upon the indicator mechanism 36. This test may be repeated for each tooth of the gear at various points along the tooth surface.

To similarly test the opposite sides of the gear teeth, it is only necessary to loosen the set screw 68 and impart a 180° turn to the upper portion of the indicator 18b so as to position the point A for engagement with the opposite sides of the gear teeth. The dial indicator mechanism 36 is mounted upon an arm 76 which may be swivelled from one side to the other on the upper portion of the bracket 34. Hence contemporaneously with the shifting of the contactor point A, the indicator mechanism is shifted 180° to the dot and dash position indicated on Figure 2. The previously described testing operation is again repeated until all of the gear teeth have been examined, if so desired.

In order to accommodate bevel gears of varying size and angularity the supports or blocks 38 and 58 are adjustable along the V-guide 40 and a T slot 78. By turning a handle 80 of the support 38 and a similar handle 82 of the support 60, said supports may be positively secured in their desired position of adjustment upon the base 30. Attention is also directed to the fact that I prefer to provide a ball bearing 84 so as to render the bar or rod 32 freely movable.

Referring now to Figure 5, it will be seen that the above described testing machine is adapted to be used for a bevel gear which varies in angularity from the bevel gear 12b. In Figure 5 a bevel gear 12c is mounted upon a spindle 24c which functions exactly the same as the previously described spindle 24b, except that it is longer in order to take care of the difference in angularity between the bevel gear 12c and the bevel gear 12b. A base cone member 14c, smaller than the base cone member 14b, is employed. With the exception of the use of an intermediate or auxiliary support 86 for the rod 32, all of the other elements of the testing mechanism correspond with the elements shown in Figures 1 and 2. This auxiliary or intermediate support 86 is preferably provided with a ball bearing 88 to reduce frictional resistance to the turning of the rod 32, and may be clamped in position upon the base 30 by manipulation of a handle 90. It will be noted that with the arrangement shown in Figure 5, the imaginary base or generating cone of the gear 12c may be rolled along an imaginary plane tangent thereto in the same manner as described in connection with Figures 1 and 2.

Figure 6 discloses the testing machine equipped with a shorter spindle 24d designed to accommodate a larger bevel gear 12d and a larger base cone member 14d. With this arrangement of the spindle and base cone member, bevel gears of the larger variety having an angularity differing from the angularity of the bevel gears 12b and 12c may be tested. In Figure 7 I have fragmentarily shown the lower end of one of the gear supporting spindles which is broken away to more clearly illustrate the manner in which the apex ball 44 is secured by means of a screw 92 against an internal conical surface 94 provided within the lower end of the spindle. This arrangement enables the ball to automatically center and seat itself when tightened in position by the screw 92.

In the testing machines thus far described the gear to be tested and the base cone member have been positioned on the same side of the pivot point or apex. Referring now to Figure 8, it will be seen that I have shown a modified machine wherein a gear 12e to be tested and a base cone member 14e are positioned on opposite sides of a pivotal point or axis 26e, which axis corresponds with the apex 26b previously described. Instead of employing the ball and socket arrangement previously described, a universal joint arrangement designated generally by the numeral 96 in Figures 8 to 10 inclusive is employed. This mechanism 96 carries the spindle 24e and through the agency of a yoke 98 and an upright supporting structure 100 the spindle 24e may be tilted about the horizontal and vertical axes indicated by the dot and dash lines in Figure 10. Thus in effect the spindle 24e swivels about the center or apex 26e in the same sense as the spindle 24b swivels about the apex 26b and the spindle 24a swivels about the apex 26a. The peripheral surface of the base cone member 14e engages a vertical plane surface 16e which is carried by the upright supporting structure 100.

An actuator 18e is provided which is pivoted at its intermediate point 102. The left extremity of the actuator is adapted to contact the involute surface of the teeth of the bevel gear 12e, and the opposite extremity is adapted to be engaged by the actuating mechanism of a conventional dial indicator means 36e which corresponds with the indicator means 36 previously described. An arm 104 is vertically adjustable within the upright frame structure 100 and serves as a support for both the contactor 18e and the indicator means 36e. It will be noted that the dial indicator means 36e is carried upon an auxiliary arm 106 which may be swivelled through 90° upon the arm or bracket 104 so as to enable the indicator to be used in indicating variations in the involute contour of both sides of the gear teeth. The contactor 18e is so designed as to enable the tooth engaging portion thereof to be swivelled through 90°.

When it is understood that the point of engagement of the contactor 18e with the teeth of the bevel gear 12e, the apex or swivel point 26e, and the plane surface 16e all lie in the same plane, it will be clear that, when rotation is imparted to the base cone member 14e along the surface 16e by manually manipulating a knurled head 52e, the imaginary base or generating cone of the bevel gear 12e will roll along a vertical plane tangent thereto, which plane includes the apex 26e and the plane surface 16e.

The machine disclosed in Figures 8 and 9 is equipped with a vernier scale 108 which cooperates with an arm 110 connected with the yoke 98 in accurately determining the angular setting of the axis of the spindle 24e. This angular setting of the axis of the spindle 24e must be in absolute accordance with the angularity of the gear to be tested so as to cause said gear to roll on its imaginary base or generating cone. The plane surface 16e is provided on a plate 56e which is adjustable transversely of the machine through the manual manipulation of a handwheel 62e. The shifting of the plate 56e corresponds with the shifting of the plate 56 previously described in connection with Figures 1 and 2. Attention is also directed to a horizontal surface 112 and a gauge roller 114, which is carried at the lower extremity of the adjusting arm 110. The surface 112 and the gauge member 114 permit the use of a height gauge to measure the distance between the axis of the roller 114 and said surface and thereby check and accurately determine the angularity of the work arbor or spindle mathematically. The base cone member 14e differs in peripheral contour from the previously described base cone members in that it is provided with an intermediate peripheral surface 116 which conforms with the frustrum of a cone, whose apex is positioned at 26e and curved peripheral surface sections 118 and 120 positioned on opposite sides of the intermediate section 116. With this arrangement the machine can be used to test gears in which the angularity and size will permit the use of the intermediate peripheral surface section 116, and will also permit gears of other size and angularity to be measured by bringing the peripheral surface section 118 or 129 into engagement with the plane surface 16e. Obviously when the inclination or angularity of the axis of the arbor 24e is varied from that shown in Figure 8, axial adjustment of the base cone member 14e along the arbor must be made. It will be noted that the knurled member 52e, in addition to serving as a handwheel, also provides sufficient weight to maintain proper engagement of the base cone member with the plane surface 16e.

In Figure 11 I have fragmentarily disclosed in cross section the lower portion of a base cone member 14f of modified form wherein the entire peripheral surface thereof is curved in cross section, as distinguished from the arrangement disclosed in Figure 8. The curved surface arrangement permits the member 14f to be angularly adjusted with respect to its complementary plane surface 16f.

From the foregoing it will be apparent that the invention contemplates a gear testing machine particularly adapted for bevel gears which comprises relatively few parts, is easy to manipulate, and may be produced by the practice of conventional machine shop methods. The machine is so designed as to enable a very accurate examination of the bevel gear teeth to determine variations from the true involute curve. The universal joint construction of the work supporting spindle or arbor in combination with the base cone member and plane surface presents a very simple and practical construction.

It should be understood that the involute curve of a bevel gear tooth surface differs from the involute curve of a spur gear in that the bevel tooth surface is a compound curve. This is due to the fact that the bevel gear surface is generated by a point in a cone rolling on a flat surface and not by a cylinder rolling on a flat surface. A point in the surface of a cone rolling on a flat surface does not follow a straight line of said surface as is the case when a cylinder rolls on a flat surface, and this introduces a compound curve in the bevel gear tooth. In other words, the true involute curve of a bevel gear tooth is globular. It may be said that a bevel gear tooth surface comprises a globular segment.

While certain specific structural details have been disclosed herein for the purpose of illustrating my invention, it should be understood that said invention is by no means limited to these specific structural arrangements, but is capable of other modifications and changes without departing from the spirit and scope of the appended claims.

Having thus described my invention, what I claim as new and desire to secure by Letters Patent is:

1. Gear testing apparatus including contactor means for engaging a gear tooth, a plane surfaced member, a roller having its peripheral surface engaging said plane surface, the axis of said roller being inclined with respect to said surface, and means for supporting a gear in co-axial relation with said roller whereby to cause said gear, when relative movement is experienced between said roller and plane surface, in effect to roll upon the generating surface thereof while one of the teeth of said gear remains in engagement with said contactor, thereby causing the contactor to move in case said tooth is out of true.

2. Gear testing apparatus including contactor means for engaging a gear tooth, a plane surfaced member, a roller having its peripheral surface engaging said plane surface, the axis of said roller being inclined with respect to said surface, the tooth engaging portion of said contactor lying in a plane coincident with said plane surface, and means for supporting a gear in co-axial relation with said roller whereby to cause said gear, when relative movement is experienced between said roller and plane surface, in effect to roll upon the generating periphery thereof while one of the teeth of said gear remains in engagement with said contactor, thereby causing the contactor to move in case said tooth is out of true.

3. Gear testing apparatus including contactor means for engaging a gear tooth, a plane surfaced member, a roller having its peripheral surface engaging said plane surface, the axis of said roller being inclined with respect to said surface, and means for supporting a gear in co-axial relation with said roller and having a pivotal axis of support positioned in a plane coincident with said plane surface whereby to cause said gear, when relative movement is experienced between said roller and plane surface, in effect to roll upon the generating circle thereof while one of the teeth of said gear remains in engagement with said contactor, thereby causing the contactor to move in case said tooth is out of true.

4. Gear testing apparatus including contactor means for engaging a gear tooth, a plane surfaced member, a roller having its peripheral surface engaging said plane surface, the axis of said roller being inclined with respect to said surface, the tooth engaging portion of said contactor lying in a plane coincident with said plane surface, and means for supporting a gear in co-axial relation with said roller and having a pivotal support axis positioned in a plane coincident with the plane which includes the tooth engaging portion of said contactor and said plane surface whereby to cause said gear, when relative movement is experienced between said roller and plane surface, in effect to roll upon the generating circle thereof while one of the teeth of said gear remains in engagement with said contactor, thereby causing the contactor to move in case said tooth is out of true.

5. Gear testing apparatus including contactor means for engaging a gear tooth, a plane surfaced member, a roller having its peripheral surface engaging said plane surface, the axis of said roller being inclined with respect to said surface, means for supporting a gear in co-axial relation with said roller whereby to cause said gear, when relative movement is experienced between said roller and plane surface, in effect to roll upon the generating circle thereof while one of the teeth of said gear remains in engagement with said contactor, thereby causing the contactor to move in case said tooth is out of true, and means for indicating movement experienced by the contactor.

6. Gear testing apparatus including contactor means for engaging a gear tooth, a plane surfaced member, a roller having its peripheral surface engaging said plane surface, the axis of said roller being inclined with respect to said surface, and pivotally supported means for supporting a gear in co-axial relation with said roller on the same side of the pivotal axis as said roller whereby to cause said gear, when relative movement is experienced between said roller and plane surface, in effect to roll upon the generating circle thereof while one of the teeth of said gear remains in engagement with said contactor, thereby causing the contactor to move in case said tooth is out of true.

7. Gear testing apparatus including contactor means for engaging a gear tooth, a plane surfaced member, a roller having its peripheral surface engaging said plane surface, the axis of said roller being inclined with respect to said surface, and pivotally supported means for supporting a gear in co-axial relation with said roller on the opposite side of the pivotal axis whereby to cause said gear, when relative movement is experienced between said roller and plane surface, in effect to roll upon the generating circle thereof while one of the teeth of said gear remains in engagement with said contactor, thereby causing the contactor to move in case said tooth is out of true.

8. Gear testing apparatus including contactor means for engaging a gear tooth, a plane surfaced member, a roller having its peripheral surface engaging said plane surface, the axis of said roller being inclined with respect to said surface, and means for supporting a gear in co-axial relation with said roller whereby to cause said gear, when relative movement is experienced between said roller and plane surface, in effect to roll upon the generating circle thereof while one of the teeth of said gear remains in engagement with said contactor, thereby causing the contactor to move in case said tooth is out of true, said gear supporting means being adjustable to vary the inclination of the roller axis with respect to said plane surface.

9. Gear testing apparatus including contactor means for engaging a gear tooth, a plane surfaced member, a roller having a peripheral conical surface engaging said plane surface, the axis of said roller being inclined with respect to said surface, and means for supporting a gear in co-axial relation with said roller whereby to cause said gear, when relative movement is experienced between said roller and plane surface, in effect to roll upon the generating circle thereof while one of the teeth of said gear remains in engagement with said contactor, thereby causing the contactor to move in case said tooth is out of true.

CARL G. OLSON.